United States Patent [19]

Kanayama

[11] Patent Number: 4,574,321

[45] Date of Patent: Mar. 4, 1986

[54] AUTOMATIC BACKSPACE DEVICE FOR A TAPE RECORDER

[75] Inventor: Katsumi Kanayama, Tokyo, Japan

[73] Assignee: Olympus Optical Company Limited, Japan

[21] Appl. No.: 443,220

[22] Filed: Nov. 22, 1982

[30] Foreign Application Priority Data

Nov. 26, 1981 [JP] Japan .......................... 56-175983[U]
Nov. 26, 1981 [JP] Japan .......................... 56-175984[U]

[51] Int. Cl.⁴ ............................................ G11B 15/48
[52] U.S. Cl. .................................................. 360/74.1
[58] Field of Search ................. 360/69, 71, 72.1, 72.3, 360/82, 13, 90, 74.1–74.7; 369/25; 307/246, 590, 595, 597, 601, 297, 592

[56] References Cited

U.S. PATENT DOCUMENTS

| | | | |
|---|---|---|---|
| 3,567,229 | 1/1968 | Ridings et al. | 360/82 |
| 3,632,893 | 1/1972 | Bolick et al. | 369/25 |
| 3,660,616 | 2/1972 | Davidge et al. | 369/27 |
| 4,075,435 | 2/1978 | Eppler | 369/25 |
| 4,321,633 | 3/1982 | Saito | 369/69 |
| 4,338,532 | 7/1982 | Houghton | 307/590 |
| 4,366,514 | 12/1982 | Sato et al. | 360/71 |
| 4,370,684 | 1/1983 | Kanayama et al. | 360/72.3 |
| 4,415,249 | 11/1983 | Tsuzuki et al. | 307/297 |
| 4,417,135 | 11/1983 | Motoyama et al. | 360/71 |

*Primary Examiner*—Donald McElheny, Jr.
*Assistant Examiner*—Steven R. Garland
*Attorney, Agent, or Firm*—Toren, McGeady, Stanger, Goldberg & Kiel

[57] ABSTRACT

The disclosed automatic backspace device, in a tape recorder or transcriber or the like, is rewound for a specific period of time. A transistor is turned on by an electrical current from a time constant circuit in response to tape reproduction seen by an operating switch. The transistor charges a capacitor which discharges a constant electrical current through a parallel-connected transistor in a current mirror circuit whose other transistor is supplied with a predetermined electrical current. Another transistor is turned on by the discharge current of the capacitor to carry out the rewinding of the magnetic tape.

5 Claims, 2 Drawing Figures

AUTOMATIC BACKSPACE DEVICE FOR A TAPE RECORDER

BACKGROUND OF THE INVENTION

Field of the Invention

The present invention relates to transcribers or tape recorders, and particularly to an automatic backspace device incorporated, for example, in a transcriber or tape recorder, and especially to an automatic backspace device wherein the magnetic tape is reliably rewound and a magnetic playback is reliably retracted from the surface of the magnetic tape even when the supply voltage fluctuates.

Conventionally, office work is enhanced by recording a letter or other document on magnetic tape and having a secretary type a draft while playing back the tape and listening to its contents.

A known transcriber allows a foot switch to start and stop the playback and also permits adjustment of the playback speed. When the typist types while listening to the recorded contents of the magnetic tape and the typing operation is appreciably slower than the playback speed, the typist must stop and pause from time to time, for example at punctuations in the draft, in order to hear the contents reliably.

However, when the playback operation is stopped for a pause, the tape may sometimes go beyond the beginning of the next sentence or phrase due to the operational delays inherent in the transcriber. Therefore, the beginning of the next sentence or phrase may be skipped when playback resumes. Therefore the next phrase or sentence can sometimes not be clearly understood. This inevitably requires the magnetic tape to be rewound a suitable length after all pauses. However, such rewind of the magnetic tape is laborious and disadvantageous.

Automatic backspace devices have been proposed to overcome these disadvantages. Such devices automatically rewind the magnetic tape a predetermined time when the playback is stopped so as to ensure understanding of the subsequent reproduced contents.

Conventional automatic backspace devices rewind the magnetic tape a predetermined amount of time, when playback is stopped, on the basis of the operation of a time constant circuit. However, such automatic backspace devices are influenced by fluctuations in the supply voltage. Such fluctuations occur most specifically in the widely available transcribers using batteries as their electrical supplies. In other words, supply voltage fluctuations may lower the voltage of the battery cell sufficiently to significantly decrease the period during which the magnetic tape is rewound. This introduces the possibility of the system not rewinding the tape completely.

Other existing automatic backspace devices use a one-shot multivibrator instead of the aforementioned time constant circuit. However, such a one-shot multivibrator is expensive. This is particularly true with respect to one-shot multivibrators using low voltage sources, such as, for example, a battery source. Therefore, these types of battery devices have the disadvantage of being difficult to manufacture from the economic point of view.

Aside from the above, rewinding a magnetic tape for a predetermined time to automatically backspace requires separating a magnetic playback head from the surface of the magnetic tape during the predetermined time period. For this purpose, proposals have been made to retract the magnetic playback head from the surface of the magnetic type electromagnetically, simultaneously with the pause instructions during playback. However, an electromagnetic arrangement may also respond to fluctuations in the voltage supply. For example, it takes a comparatively long time to move the magnetic playback head when the battery voltage that supplies the system drops. Therefore, in the worst case, a rewind may start before the magnetic playback head separates from the surface of the magnetic tape. This may result in damage to the magnetic playback head.

SUMMARY OF THE INVENTION

An object of the present invention is to eliminate the aforementioned disadvantages of conventional automatic backspace devices.

Another object of the present invention is to provide an automatic backspace device that always assures a predetermined rewind time irrespective of the fluctuations in supply voltage.

Still another object of the present invention is to provice an automatic backspace device in which the magnetic playback head retracts from the surface of a magnetic tape reliably even though the supply voltage fluctuates.

According to the present invention, there is provided an automatic backspace device for assuring a predetermined time period of tape rewinding, comprising a reproduction operating switch for carrying out the reproduction of a magnetic tape, a transistor adapted to be turned on by charged electrical current fed from a time constant circuit in association with the actuation of the stopping operation of tape reproduction through the above-mentioned switch, a capacitor arranged to be charged with electrical current during a period when the transistor is turned on, a current mirror circuit having a pair of transistors one of which is supplied with a predetermined current and the other one of which is connected with the condenser in parallel, for causing the capacitor to discharge a constant current therefrom in accordance with the above-mentioned predetermined current, and a transistor adapted to be turned on by the discharged current fed from the above-mentioned capacitor, for carrying out the rewinding of the magnetic tape during the transistor is turned on.

The transistor for carrying out the above-mentioned tape rewinding is connected with a tape rewinding switch in parallel.

According to another aspect of the present invention, there is provided an automatic backspace device in which the retraction of a magnetic playback head from the surface of a magnetic tape is stably executed, comprising a tape reproduction operating switch for carrying out the reproduction of a magnetic tape, means for feeding a constant discharge current in association with the actuation of the stopping operation of tape reproduction through this switch, irrespective of discharge current from a time constant circuit having a time constant corresponding to supply voltage, or irrespective of the supply voltage, a transistor adapted to be turned on by the constant discharge current fed from the above-mentioned means, a capacitor adapted to be charged with electrical current during the period when this transistor is turned on, a current mirror circuit having a pair of transistors one of which is supplied with a predetermined current and the other one of which is connected in parallel with the aforementioned capacitor, for causing the capacitor to discharge a constant current therefrom in accordance with the aforementioned predetermined current, and a transistor adapted to be turned on by the discharged current fed from the aforementioned capacitor, for carrying out the rewind of the magnetic tape when the transistor is turned on.

According to a feature of the invention, the aforementioned constant discharged current feeding means is provided with a circuit including a capacitor and a diode, for forming a time constant circuit having a time constant corresponding to the supply voltage.

Further, the aforementioned means for feeding a constant discharged current irrespective of supply voltage includes the combination of a capacitor and a current mirror circuit.

DESCRIPTION OF THE PREFERRED EMBODIMENTS

Figure 1:
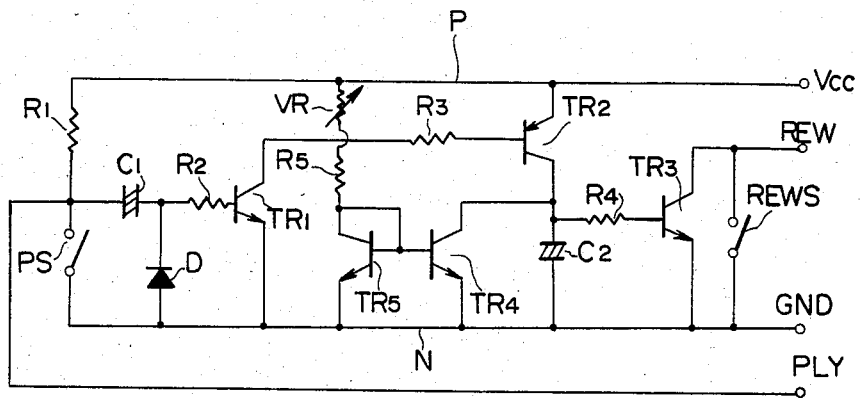
FIG. 1 is a circuit diagram of one exemplified form of the present invention.

In FIG. 1, reference numeral P denotes a positive busbar connected to an electrical supply $V_{CC}$, while N denotes a negative busbar connected to a ground terminal GND.

A series circuit composed of a resistor $R_1$ and a reproduction operating switch PS is connected between both busbars P,N. The connected point of the resistor $R_1$ and the switch PS in the series circuit is electrically connected to a reproduction input terminal PLY. With this arrangement, when the switch PS is turned on a reproducing means which is not shown is actuated through the reproduction input terminal PLY.

The connected point of the resistor $R_1$ and the switch PS is connected to the base of a transistor $TR_1$ through a capacitor $C_1$ and a resistor $R_2$. A diode D is connected between the busbar N and the connected point of the capacitor $C_1$ and the resistor.

The emitter of the transistor $TR_1$ is connected to the busbar N, and the collector thereof is connected to the base of a transistor $TR_2$ through a resistor $R_3$. The emitter of the transistor $TR_2$ is connected to the busbar P, and the collector thereof is connected to the busbar N through a capacitor $C_2$ and also connected to the base of a transistor $TR_3$ through a resistor $R_4$. A rewinding switch REWS is connected between the emitter and the collector of the transistor $TR_3$. Further, the emitter and the collector of the transistor $TR_3$ are connected to the busbar N and a tape rewinding terminal REW, respectively. In this arrangement, the switch REWS is provided so that a tape rewinding means which is not shown is actuated through the tape rewinding terminal REW when the switch is turned on.

The connected point of the transistor $TR_2$ and the condenser $C_2$ is connected to the collector of a transistor $TR_4$ which is connected through its emitter to the busbar N and is also connected through its base to both base and collector of the transistor $TR_5$. Therefore, the transistors $TR_4$, $TR_5$ constitute a current mirror circuit. In this arrangement, the emitter of the transistor $TR_5$ is connected to the busbar N and the collector thereof is connected to the busbar P through a resistor $R_5$ and a variable resistor VR.

In operation, the reproduction operating switch PS is turned on and the magnetic tape is played back by the reproducing means, through the reproduction input terminal PLY.

At this stage, when the reproduction operating switch PS is opened in order to stop the tape reproduction, the reproducing means which has been actuated through the reproduction input terminal PLY is deenergized so that the tape reproduction ceases. Further, the charge current of the capacitor $C_1$ passes through the base and the emitter of the transistor $TR_1$ from the time constant circuit composed of the resistor $R_1$, the capacitor $C_1$ and the resistor $R_2$, resulting in that the transistor $TR_1$ being turned on. Thus, the transistor $TR_2$ is also turned on. In this case, the transistors $TR_1$, $TR_2$ are connected together in accordance with the time constant of the time constant circuit composed of the resistors $R_1$, $R_2$ and the capacitor $C_1$, but the time period of this conduction is set to a time necessary for charging the capacitor $C_2$, as will be explained hereinafter.

When the transistor $TR_2$ is turned on the capacitor $C_2$ is charged with electrical current. Since the transistors $TR_1$, $TR_2$ are turned off when charging of the capacitor $C_2$ has been completed, the capacitor $C_2$ then initiates the discharge of the charged current. This discharged current passes through the resistor $R_4$ and the base and the emitter of the transistor $TR_3$ which is, therefore, turned on. In this case, since turning-on the transistor $TR_3$ simulates the same condition as the tape rewinding switch REWS being turned on, the tape rewinding means is actuated through the tape rewinding input terminal REW so that the rewinding of the magnetic tape is started.

Meanwhile, the discharged current from the capacitor $C_2$ is also fed to the transistor $TR_4$. In this stage, a predetermined current of $(V_{CC}-V_F)/(VR+R_5)$, where $V_{CC}$ is the supply voltage and $V_F$ is the forward direction voltage of the transistor $TR_5$, is fed to the transistor $TR_5$ through the variable resistor VR and the resistor $R_5$.

Because the transistors $TR_4$ and $TR_5$ form a current mirror circuit, the electrical current $(V_{CC}-V_F)/(VR+R_5)$ is also fed to the transistor $TR_4$. Therefore, the capacitor $C_2$ discharges a constant current through the transistor $TR_4$. Then the terminal voltage of the capacitor $C_2$ reaches a predetermined voltage $V_{TH}$ or the OFF-state voltage of the transistor $TR_3$ which is, therefore, turned off so that the tape rewind ceases.

At this stage, the energy Q for which the terminal voltage $V_{CC}$ of the capacitor $C_2$ reaches the predetermined voltage $V_{TH}$ is represented by:

$$Q = C \times (V_{CC} - V_{TH}) = T \times i \tag{1}$$

where

C is the capacitance of the capacitor $C_2$;

$V_{CC}$ is supply voltage; and T is the time for discharge from $V_{CC}$ to $V_{TH}$.

Further, the discharge current of the capacitor $C_2$ is represented, as above-mentioned, by:

$$i = \frac{V_{CC} - V_F}{VR + R_5} \tag{2}$$

Then if the equation (2) is substituted into the equation (1), $$C \times (V_{CC} - V_{TH}) = T \times \frac{V_{CC} - V_F}{VR + R_5} \quad (3)$$

and, with $V_{TH} = V_F$, from the equation (3), $$T = C \times (VR + R_5) \quad (4)$$

is attained. Accordingly, the discharging condition of the capacitor $C_2$ can be determined from the variable resistor VR and the resistor $R_5$, irrespective of the supply voltage, which is clearly understood from the equation (4). Therefore, the time period for the tape rewind can be always made constant even though fluctuations in the supply voltage $V_{CC}$ occur and a reliable backspace can be obtained.

This arrangement assures a predetermined rewind time even when the supply voltage fluctuates. The system eliminates shortening of the rewind time even if the battery voltage of a supply drops. This makes a reliable backspace certain. The automatic backspace device according to the present invention is cheap and economical in comparison with the one using an expensive low voltage multivibrator.

Figure 2:
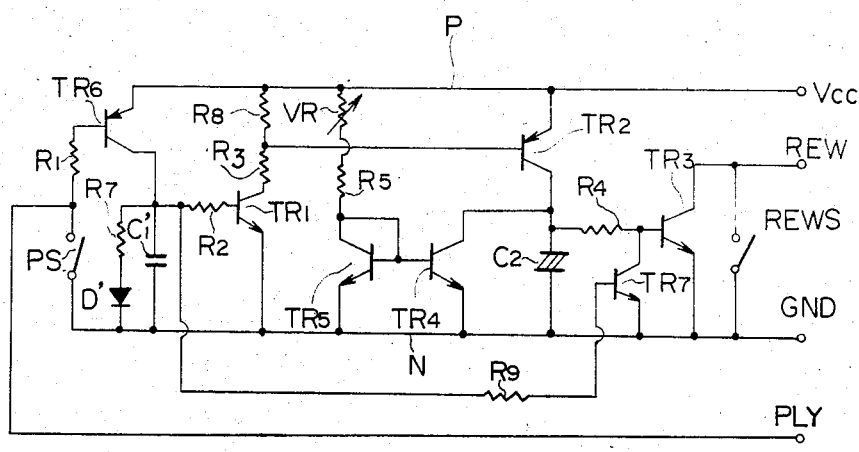
FIG. 2 is a circuit diagram of another exemplified form of the present invention.

FIG. 2 discloses a second embodiment of the present invention. Here an automatic backspace device always provides a predetermined tape rewind time even if supply voltage fluctuates, and the magnetic playback head is reliably retracted from the surface of a magnetic tape.

A transistor $TR_6$ is connected through its emitter to a busbar P and is also connected through its base to a busbar N by way of a resistor $R_1$ and a playback operating switch PS. Also, the collector of the transistor $TR_6$ is connected to the busbar N through a capacitor $C'_1$. A series circuit composed of a resistor $R_7$ and a diode $D'$ having a polarity as indicated in FIG. 2, is connected across the capacitor $C'_1$ to form a time constant circuit.

The connecting point of the transistor $TR_6$ and the capacitor $C'_1$ is connected to the base of a transistor $TR_1$ through a resistor $R_2$. The emitter of the transistor $TR_1$ is connected to the busbar N, and the collector is connected to the busbar P through resistors $R_3$, $R_8$. The connected point of both resistors $R_3$, $R_8$ is in turn connected to the base of a transistor $TR_2$.

Further, the base of a transistor $TR_3$ is connected with the collector of a transistor $TR_7$ which is connected through its emitter to the busbar N and is also connected through its base to the collector of the transistor $TR_6$ by way of a resistor $R_9$.

The remaining construction of this second embodiment of the present invention is substantially identical with that shown in FIG. 1 so that a detailed explanation is omitted. Like reference characters refer to like elements.

In the description of the operation of the automatic backspace device shown in FIG. 2, the parts which are different from the parts in the first exemplified form of the present invention, are explained in detail.

First the reproduction operating switch PS is turned on, and, therefore, the magnetic tape is played back by reproducing means which is not shown, through a reproduction input terminal PLY.

In this stage, electrical current passes from the busbar P through the emitter and the base of the transistor $TR_6$, the resistor $R_1$ and the switch PS, and, therefore, the transistor $TR_6$ is turned on. Electrical current now charges the capacitor $C'_1$ in the time constant circuit composed of the capacitor $C'_1$, the resistor $R_7$ and the diode $D'$.

In this condition, when the reproduction, i.e. playback, operating switch PS is opened for stopping the tape playback, the reproducing means which has been actuated through the reproduction input terminal PLY, is deenergized so that the tape playback ceases. Further, the opening of the reproduction operating switch PS also turns off the transistor $TR_6$. Therefore, discharge current from the capacitor $C'_1$ passes through the base and the emitter of the transistor $TR_1$ in accordance with the time constant of the time constant circuit, and, therefore, the transistor $TR_1$ is turned on. resulting in energization of the transistor $TR_2$. Transistor $TR_5$ is also turned on so that the operation of the tape rewind by the transistor $TR_3$ is inhibited. The voltage of the capacitor $C'_1$ is determined by the supply voltage $V_{CC}$ and the internal resistance of the diode $D'$ is also varied by the charge voltage at this time. Since, as well-known, the diode $D'$ increases its internal resistance the more the voltage is decreased, the resistance of the diode $D'$ is increased when the charging voltage of the capacitor $C'$ is lowered due to the voltage drop so that the time constant of the time constant circuit is increased. Thereby the discharge current from the capacitor $C'_1$ flows for a relatively long time. Accordingly, the transistor $TR_7$ inhibits the tape rewind for this time period so that the retraction of the magnetic playback head by the magnetic means can be always assured even if supply voltage is lowered.

Thus, with this arrangement, the time period necessary for retracting the magnetic playback head from the surface of the magnetic tape can be prolonged, corresponding to the lowering of supply voltage, so that the retraction of the magnetic playback head from the surface of the magnetic tape can be stably carried out even though the suply voltage fluctuates. This eliminates damage to the surface of the magnetic playback head due to tape rewind before the complete separation of the magnetic playback head from the magnetic tape surface. Further, for the same reason mention in the first embodiment of the present invention, a predetermined time period for the tape rewinding can be always obtained even if the supply voltage fluctuates. This eliminates the problem of shortening of the time period for the tape rewind even when supply voltage is lowered when a battery supplies electrical power. A stable automatic backspace is thus obtainable. Further, the automatic backspace device according to to the second embodiment of the present invention is also cheap and economical in comparison with the one having an expensive low voltage multivibrator.

While the invention has been described with reference to exemplified embodiments, it will be understood that the present invention is not limited to these embodiments but the foregoing and other changes in form and details can be made without departing from the spirit and scope of the present invention.

For example, the present invention has been explained concerning the transcribers through the above description. However, the present invention is also, of course, applicable to tape recorders.

Further, for example, although the time constant of the time constant circuit is varied, depending upon supply voltage, by the diode $D'$ in the second embodiment of the present invention, in order to assure the retraction of the magnetic playback head from the surface of the magnetic tape, the retraction of the magnetic playback head from the surface of the magnetic tape can also be assured by combining a current mirror circuit similar to that mentioned above, with the capacitor $C'_1$ for always obtaining a constant discharge time irrespective of fluctuations in supply voltage.

I claim:

1. An automatic backspace signal generating device characterized by a reproduction operating switch for actuating reproduction of a magnetic tape; a time constant circuit, means including a first transistor coupled to said time constant circuit for being turned on by said time constant circuit in response to operation of said reproduction operating switch for supplying a control current; a capacitor for being charged with the control current during a time period in which said first transistor is turned on; component means for supplying current; a current mirror circuit having a second transistor for forming a predetermined electrical current with said component means and a third transistor connected in parallel with said capacitor for causing said capacitor to carry out a constant current discharge in accordance with said predetermined electrical current; and a fourth transistor responsive to electrical current discharge from said capacitor for producing a rewind signal for rewinding said magnetic tape while said transistor is turned on.

2. An automatic backspace device as set forth in claim 1, characterized in that said fourth transistor is connected in parallel with a tape rewinding switch.

3. An automatic backspace device characterized by a reproduction operating switch for actuating a magnetic tape; producing means for producing a constant discharge current in response to operation of said switch, a time constant circuit having a time constant; a first transistor which is turned on in response to current from said producing means, a capacitor, means for supplying electrical current to said capacitor during a time period when said first transistor is turned on; a current mirror circuit having second and third transistors; means connected to said second transistor for forming a predetermined electrical current; and the third transistor being connected in parallel with said capacitor for discharging said capacitor with said predetermined electrical current; and a fourth transistor to be turned on in response to electrical current discharged by said capacitor for producing a rewind signal and rewinding said magnetic tape while said fourth transistor is turned on.

4. An automatic backspace device as set forth in claim 3 characterized in that said means for producing said constant discharged current is provided with a circuit having a second capacitor and a fifth transistor which is used as a time constant circuit having a time constant in accordance with supply voltage.

5. An automatic backspace device as set forth in claim 3 characterized in that said means for producing said constant discharged current is provided with the combination of a second capacitor and said current mirror circuit.

* * * * *